(12) United States Patent
Huybrechts et al.

(10) Patent No.: US 10,862,584 B2
(45) Date of Patent: Dec. 8, 2020

(54) APPARATUS FOR MONITORING FIBER SIGNAL TRAFFIC AT A FIBER CONNECTOR

(71) Applicant: COMMSCOPE CONNECTIVITY BELGIUM BVBA, Kessel-Lo (BE)

(72) Inventors: Koen Huybrechts, Heverlee (BE); Jan Watté, Grimbergen (BE); Stefano Beri, Zaventem (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/735,023

(22) Filed: Jan. 6, 2020

(65) Prior Publication Data

US 2020/0220616 A1    Jul. 9, 2020

Related U.S. Application Data

(63) Continuation of application No. 16/075,259, filed as application No. PCT/EP2017/052475 on Feb. 3, 2017, now Pat. No. 10,530,473.

(Continued)

(51) Int. Cl.
*H04B 10/079* (2013.01)
*G02B 6/42* (2006.01)
(Continued)

(52) U.S. Cl.
CPC ..... *H04B 10/07955* (2013.01); *G02B 6/2551* (2013.01); *G02B 6/3846* (2013.01);
(Continued)

(58) Field of Classification Search
CPC combination set(s) only.
See application file for complete search history.

(56) References Cited

U.S. PATENT DOCUMENTS

| 4,103,154 A | 7/1978 | D'Auria |
| 4,941,724 A | 7/1990 | Couden et al. |

(Continued)

FOREIGN PATENT DOCUMENTS

| EP | 1 485 737 B1 | 7/2009 |
| JP | 2005-208239 A | 8/2005 |

(Continued)

OTHER PUBLICATIONS

International Search Report and Written Opinion of the International Searching Authority for International Patent Application No. PCT/EP2017/052475 dated Jun. 21, 2017, 18 pages.

*Primary Examiner* — Omar S Ismail
(74) *Attorney, Agent, or Firm* — Merchant & Gould P.C.

(57) ABSTRACT

A system for monitoring a signal on an optical fiber includes a fiber optic connector having a housing couplable to a receptacle. An optical fiber that transmits a first optical signal has first fiber core at least partially surrounded by a cladding and has a first end terminating proximate the housing. The first optical signal is transmitted along the first fiber core. An optical tap has a first tap waveguide arranged and is configured to receive at least part of the first optical signal as a first tap signal. The first tap waveguide comprises an output port for the first tap signal for directing the tap signal to a detector unit. In other embodiments, a detector unit detects light from the optical signal that is propagating along the fiber cladding.

20 Claims, 16 Drawing Sheets

Related U.S. Application Data

(60) Provisional application No. 62/291,310, filed on Feb. 4, 2016.

(51) Int. Cl.
*G02B 6/38* (2006.01)
*G02B 6/255* (2006.01)

(52) U.S. Cl.
CPC ......... *G02B 6/3885* (2013.01); *G02B 6/3897* (2013.01); *G02B 6/4287* (2013.01)

(56) References Cited

U.S. PATENT DOCUMENTS

| | | | |
|---|---|---|---|
| 5,500,913 A | 3/1996 | Allen et al. | |
| 5,708,265 A | 1/1998 | Poole | |
| 6,856,735 B2* | 2/2005 | Chang | G02B 6/12004 385/31 |
| 9,118,414 B2 | 8/2015 | Storey et al. | |
| 9,645,335 B2 | 5/2017 | Gaber | |
| 2001/0055446 A1* | 12/2001 | Iwashita | G02B 6/3821 385/49 |
| 2002/0110328 A1* | 8/2002 | Bischel | H01S 5/02252 385/49 |
| 2003/0002771 A1* | 1/2003 | Cheng | G02B 6/125 385/14 |
| 2003/0174959 A1* | 9/2003 | Morris, Jr. | G02B 6/26 385/48 |
| 2004/0022494 A1 | 2/2004 | Liddle et al. | |
| 2004/0022495 A1 | 2/2004 | Shapiro et al. | |
| 2006/0158655 A1* | 7/2006 | Everett | A61B 3/102 356/479 |
| 2007/0036506 A1 | 2/2007 | Kewitsch | |
| 2007/0081226 A1* | 4/2007 | Sommer | G02B 6/2937 359/337.1 |
| 2007/0092176 A1 | 4/2007 | Murphy et al. | |
| 2008/0069497 A1 | 3/2008 | Tissot et al. | |
| 2008/0218355 A1* | 9/2008 | Downie | H04B 10/2575 340/572.7 |
| 2009/0103867 A1* | 4/2009 | Huang | G02B 6/26 385/48 |
| 2010/0074616 A1* | 3/2010 | Kewitsch | G02B 6/4202 398/38 |
| 2010/0080554 A1 | 4/2010 | Aguren | |
| 2010/0316334 A1 | 12/2010 | Kewitsch | |
| 2010/0329604 A1 | 12/2010 | Kojima et al. | |
| 2011/0229085 A1 | 9/2011 | Bradley et al. | |
| 2015/0084440 A1 | 3/2015 | Erdmann et al. | |
| 2015/0293311 A1 | 10/2015 | Coffey et al. | |
| 2015/0323752 A1 | 11/2015 | Gaber | |
| 2016/0178851 A1 | 6/2016 | Lu et al. | |
| 2017/0176696 A1 | 6/2017 | Gaber | |
| 2019/0049337 A1 | 2/2019 | Coffey et al. | |

FOREIGN PATENT DOCUMENTS

| | | |
|---|---|---|
| WO | 2015/013264 A1 | 1/2015 |
| WO | 2015/121804 A1 | 8/2015 |
| WO | 2017/009468 A1 | 1/2017 |
| WO | 2017/132549 A1 | 8/2017 |

* cited by examiner

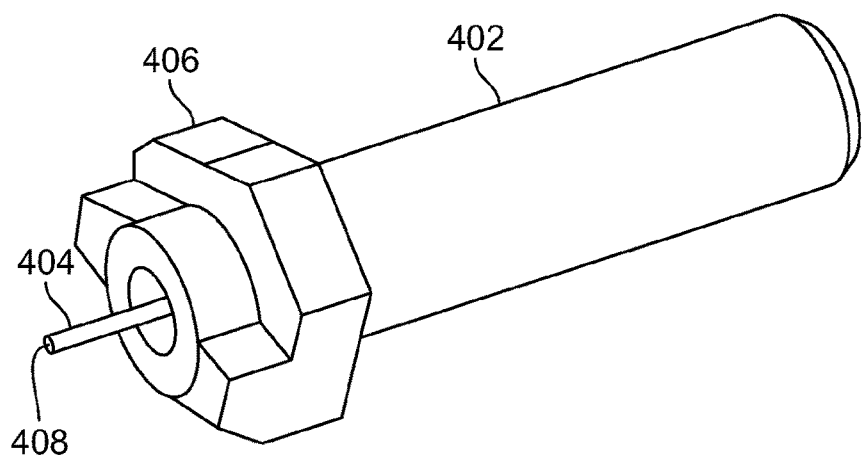
FIG. 4A
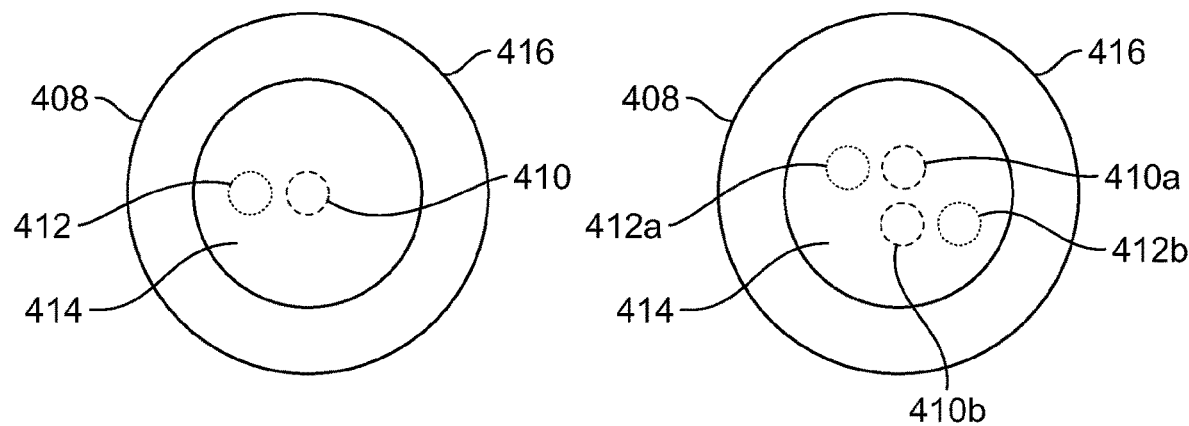
FIG. 4B
FIG. 4C

APPARATUS FOR MONITORING FIBER SIGNAL TRAFFIC AT A FIBER CONNECTOR

CROSS-REFERENCE TO RELATED APPLICATION

This application is a continuation of U.S. patent application Ser. No. 16/075,259, filed on Aug. 3, 2018, now U.S. Pat. No. 10,530,473, which is a National Stage Application of PCT/EP2017/052475, filed on Feb. 3, 2017, which claims the benefit of U.S. Patent Application Ser. No. 62/291,310, filed on Feb. 4, 2016, the disclosures of which are incorporated herein by reference in their entireties. To the extent appropriate, a claim of priority is made to each of the above disclosed applications.

FIELD OF THE INVENTION

The present invention is generally directed to optical transmission networks, and more particularly to devices for monitoring signals propagating along fibers.

BACKGROUND OF THE INVENTION

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates one embodiment of a network 100 deploying fiber optic lines. In the illustrated embodiment, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 that distribute signals to the end users 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

An incoming signal is received from the central office 101, and is then typically split at the FDH 103, using one or more optical splitters (e.g., 1×8 splitters, 1×16 splitters, or 1×32 splitters) to generate different user signals that are directed to the individual end users 105. In typical applications, an optical splitter is provided prepackaged in an optical splitter module housing and provided with a splitter output in pigtails that extend from the module. The optical splitter module provides protective packaging for the optical splitter components in the housing and thus provides for easy handling for otherwise fragile splitter components. This modular approach allows optical splitter modules to be added incrementally to FDHs 103 as required. The number of end users may change, however, for example through the addition of new customers to the network or by customers dropping out of the network, and so occasions arise where the module in the FDH 103 needs to be replaced. Additionally, other circumstances may arise when the technician has to visit the FDH 103 to maintain or replace other units.

When replacing equipment, a technician has to disconnect fiber cables from the unit being worked on, and may need to disconnect the fiber cable even when it is just being maintained. Currently, there is no way for the technician to know whether an optical signal is being carried on an optical fiber he or she is about to remove. The only way a technician can determine whether or not a particular fiber cable is carrying an optical signal is to remove the fiber cable and place its output end by a power meter. This is unsatisfactory. For example, a technician may remove a cable carrying an optical signal under the belief that it is not currently carrying an optical signal, which can result in an interruption of service to downstream customers. Also, when checking for breaks, faults etc., it is cumbersome and time consuming to disconnect each fiber cable in turn and measure for the presence of an optical signal.

There is, therefore, a need for a device that permits a technician to easily and quickly, without having to remove a connector, determine whether an optical signal is propagating along the fiber cable.

SUMMARY OF THE INVENTION

In one embodiment of the invention, a system for monitoring a signal on an optical fiber includes a fiber optic connector having a housing couplable to a receptacle. An optical fiber that transmits a first optical signal has a first fiber core at least partially surrounded by a cladding and has a first end terminating proximate the housing. The first optical signal is transmitted along the first fiber core. An optical tap has a first tap waveguide arranged and is configured to receive at least part of the first optical signal as a first tap signal. The first tap waveguide comprises an output port for the first tap signal.

In another embodiment of the invention, a system for monitoring a signal on an optical fiber includes a fiber optic connector having a housing couplable to a receptacle and an optical fiber for transmitting an optical signal. The optical fiber has a first fiber core at least partially surrounded by a cladding and has a first end terminating proximate the housing. The optical signal is transmitted along the optical fiber in at least one fiber-guided optical mode. A first portion of the optical signal is guided by the fiber core and a second portion of the optical signal is guided by the cladding. An optical detector is disposable proximate the cladding to detect at least part of the second portion of the optical signal as a tap signal.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 4A schematically illustrates a fiber stub and ferrule according to an embodiment of the invention;

FIG. 4B schematically illustrates a dual-core fiber stub according to an embodiment of the invention;

FIG. 4C schematically illustrates a fiber stub used for tapping light from a dual-core fiber, with two secondary cores, according to an embodiment of the invention;

Figure 1:
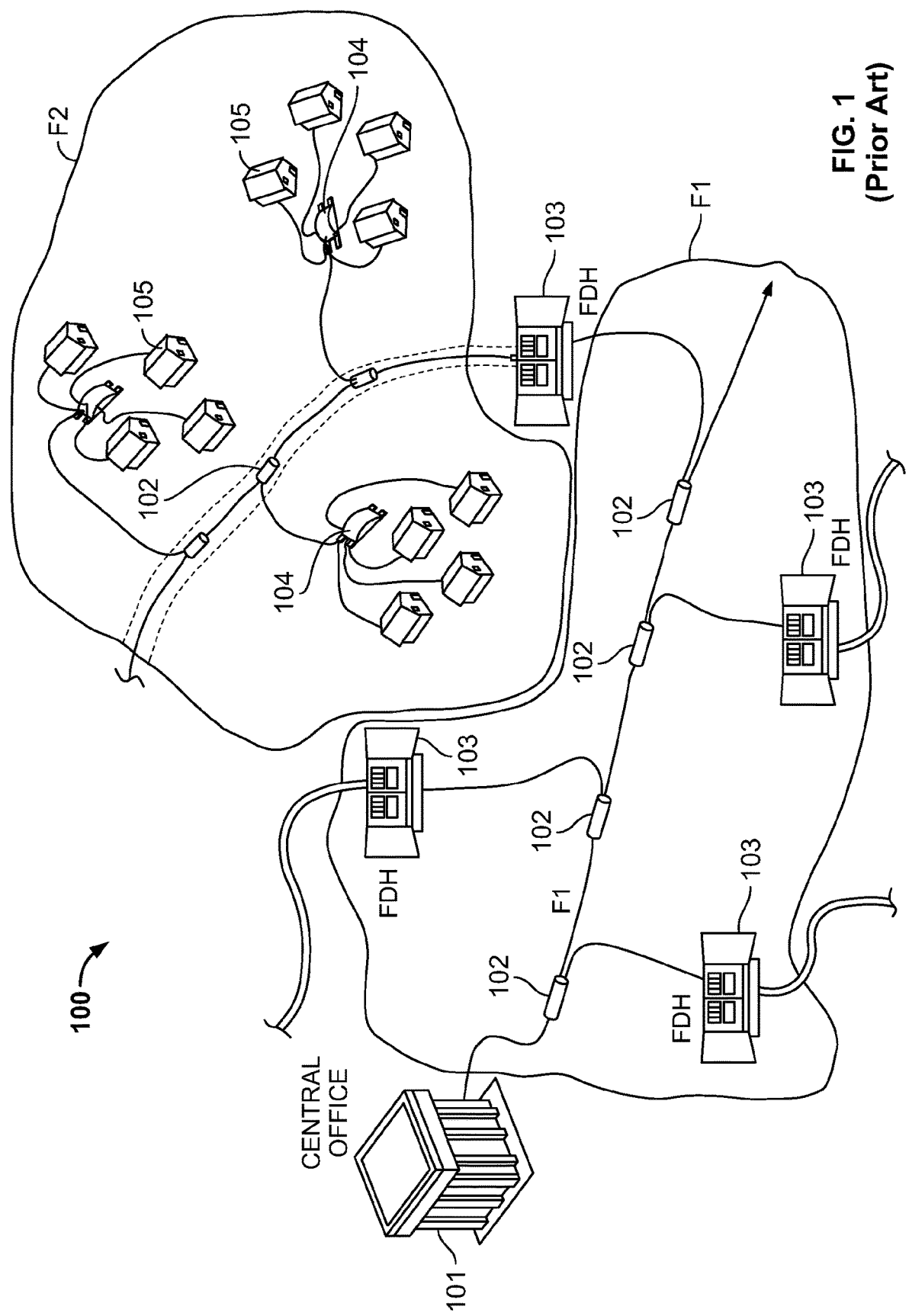
FIG. 1 schematically illustrates various elements of an optical data distribution and communication network.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to various optical devices and systems that can provide benefit in optical networks by providing for easy monitoring of signal traffic passing through a fiber connector. The ability to monitor the presence of an optical signal passing through a fiber at a connector while the connector remains connected to its receptacle permits the field service technician to ensure the presence of signal traffic without the need to disconnect any connectors from their receptacles, thus saving time and reducing wear on the physical connector components.

Figure 2:
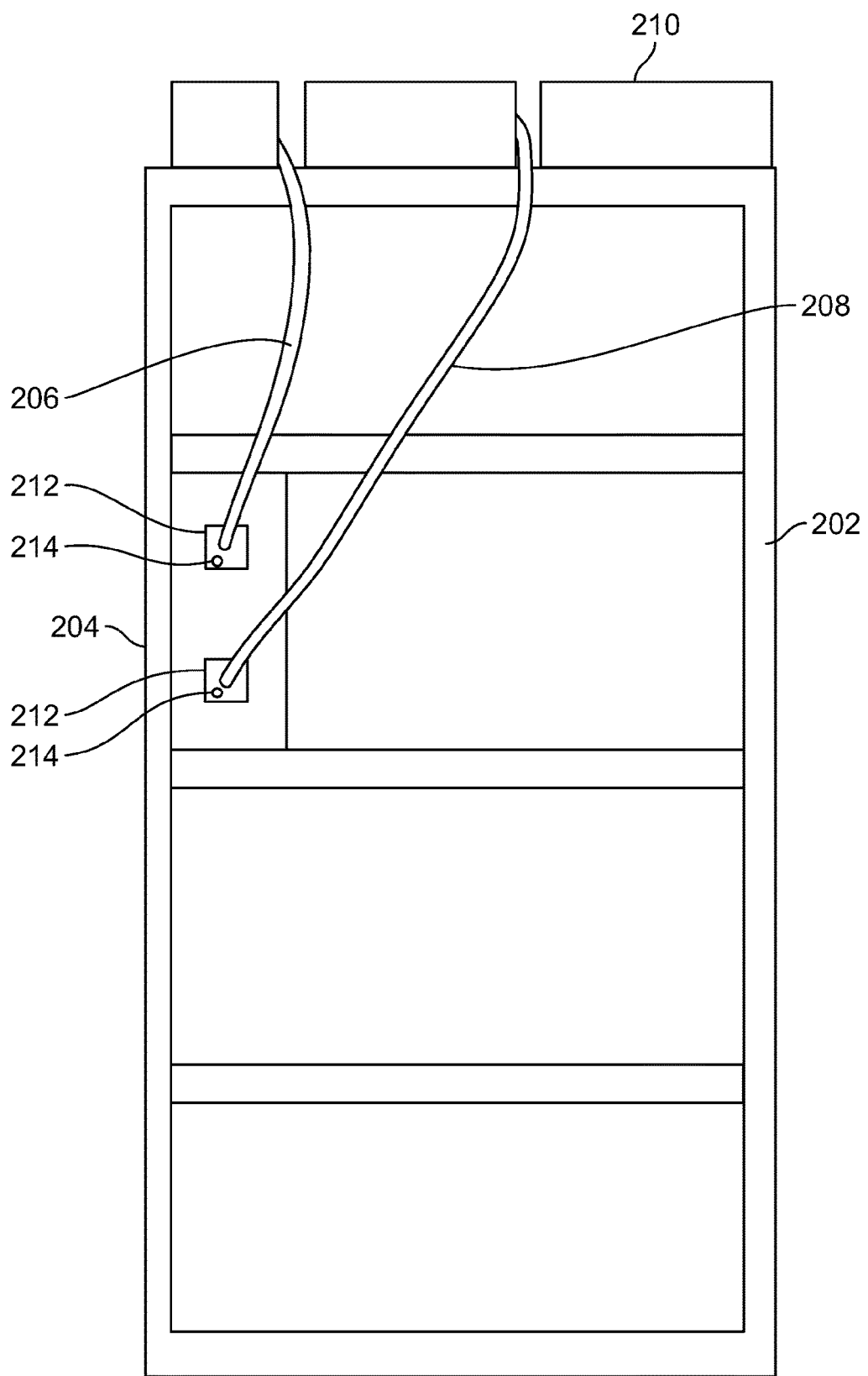
FIG. 2 schematically illustrates an embodiment of a rack as may be found in a fiber distribution hub, with fibers connected to components on the rack according to embodiments of the invention.

An embodiment of part of an FDH is schematically illustrated in FIG. 2, which shows an equipment rack 202 that is capable of carrying a number of optical modules 204. Only one optical module 204 is shown in the illustration, although one of ordinary skill will understand that the rack 202 may carry more optical modules 204. An optical module 204 contains optical components that can operate on the light propagating along an optical fiber, for example an optical module 204 may include a splitter, combiner, amplifier, optical switch circuit or the like. The optical module 204 may be attached to one or more input fibers and one or more output fibers. Input fibers can carry light into the FDH from the central office and can carry light from the FDH to the central office. Output fibers can carry light from the FDH towards an end user, and can carry light from the end user into the FDH. In the illustrated embodiment, the optical module 204 is coupled to one input fiber 206 and one output fiber 208, although it will be understood that different numbers of input and output fibers 206, 208 may be coupled to the optical module 204. In the illustrated embodiment, the input and output fibers 206, 208 are carried above the rack 202 by a track 210.

The fibers 206, 208 are connected to the optical module 204 by connectors 212. In certain embodiments, the connectors 212 include indicators 214 that indicate to a technician servicing the rack 202 whether an optical signal is passing along the respective fiber 206, 208. In some embodiments, the technician may be provide information regarding the presence of an optical signal propagating in one direction along an optical fiber. In other embodiments, the technician may be provided information regarding the presence of optical signals propagating in both directions along the optical fiber.

Figure 3:
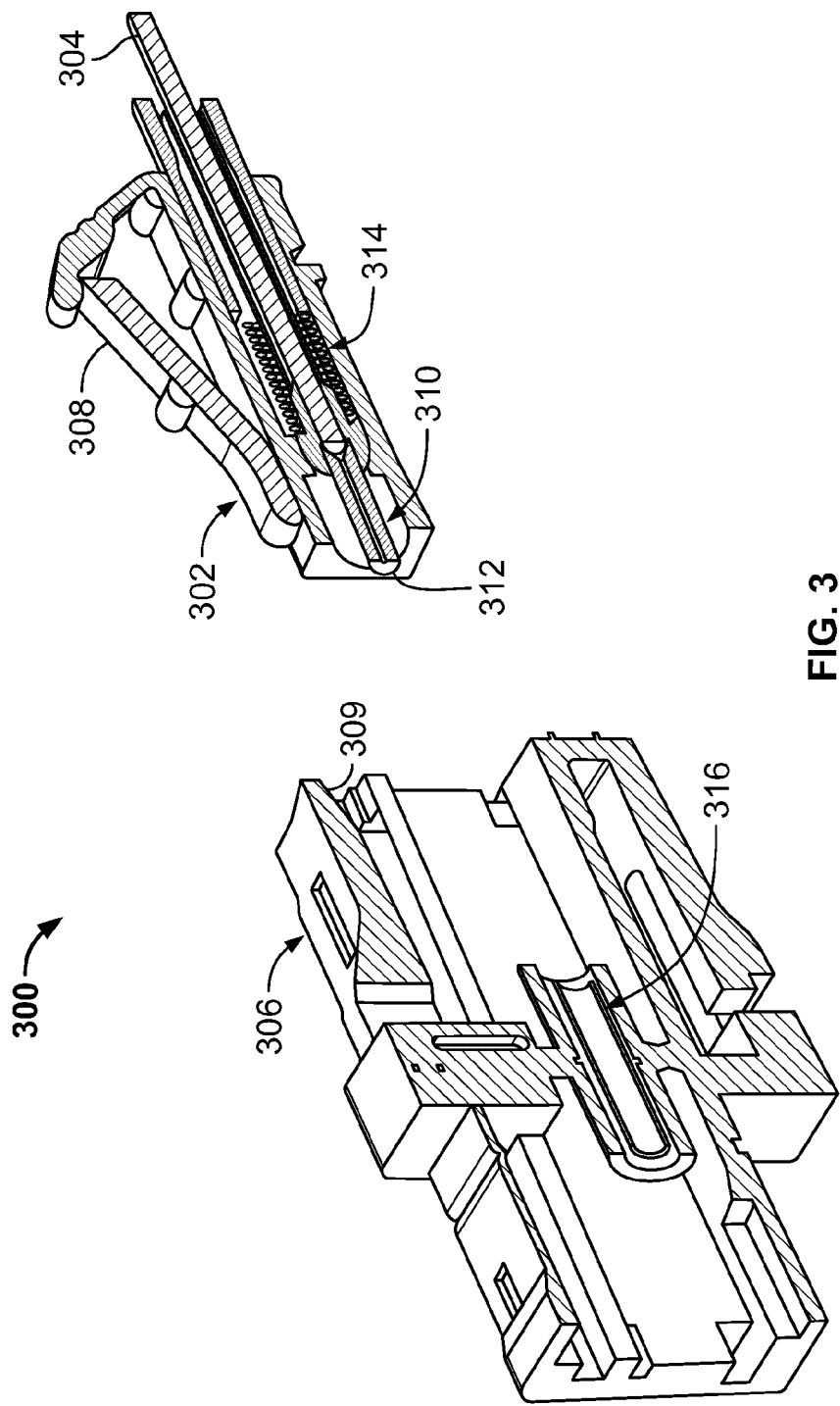
FIG. 3 schematically illustrates a fiber connector according to an embodiment of the invention.
Figure 5A:
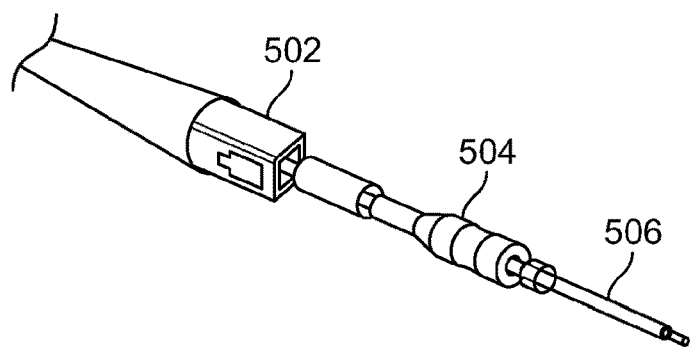
FIGS. 5A-5H schematically illustrate steps for making a fiber connector according to an embodiment of the invention.
Figure 5B:
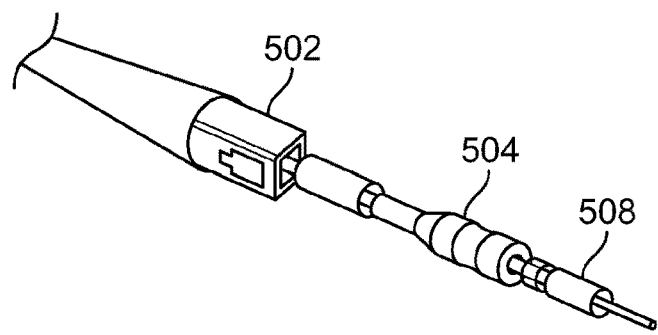
Figure 5C:
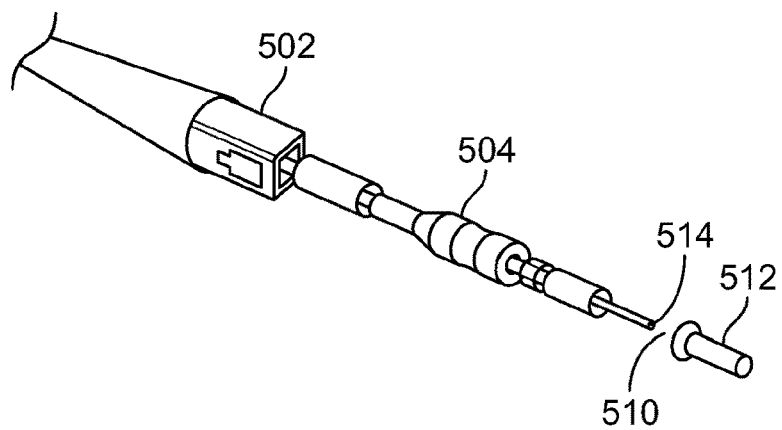
Figure 5D:
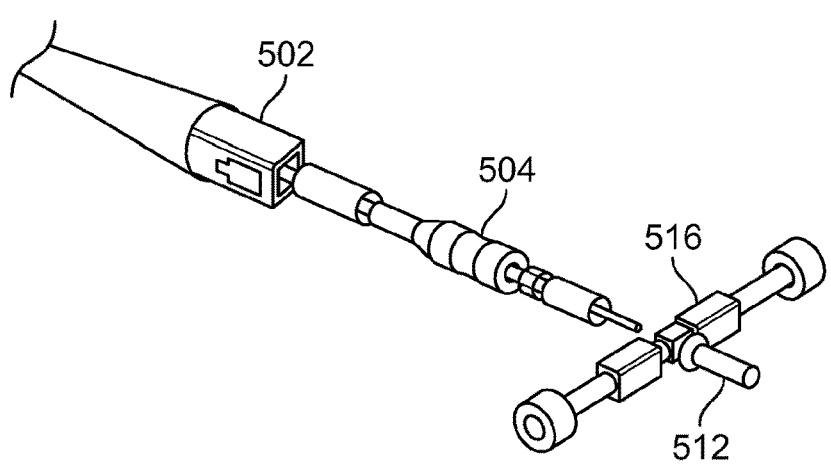
Figure 5E:
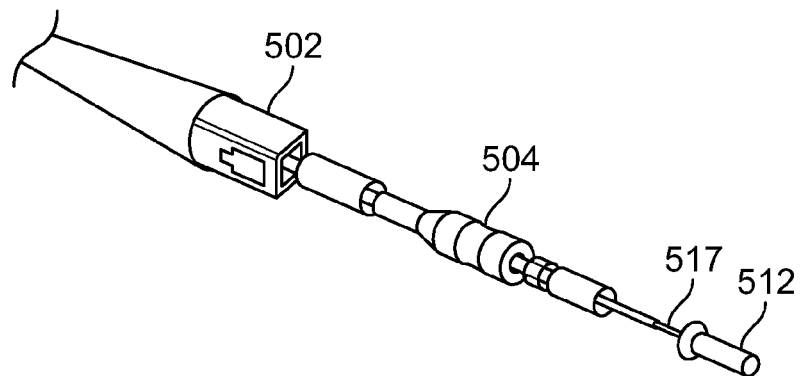
Figure 5F:
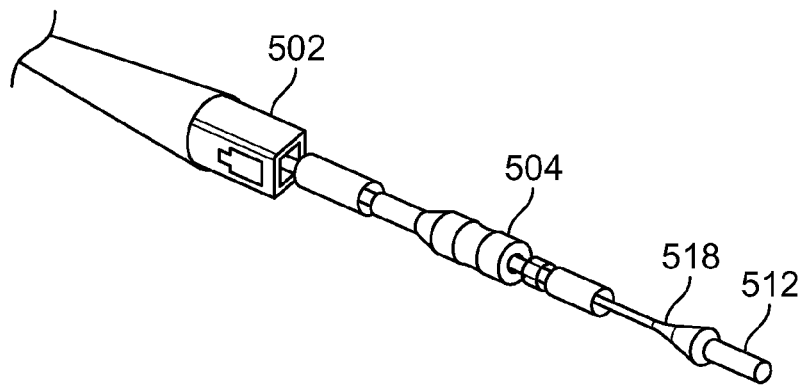
Figure 5G:
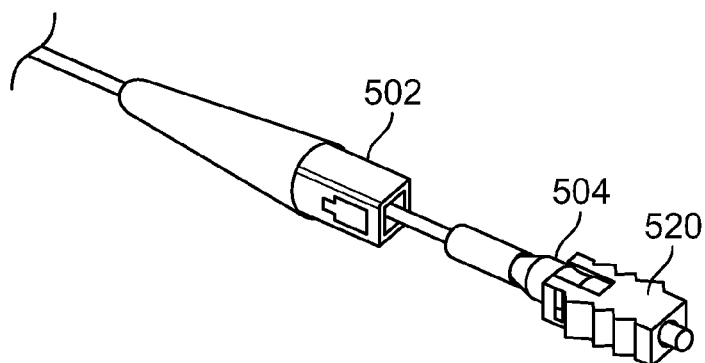
Figure 5H:
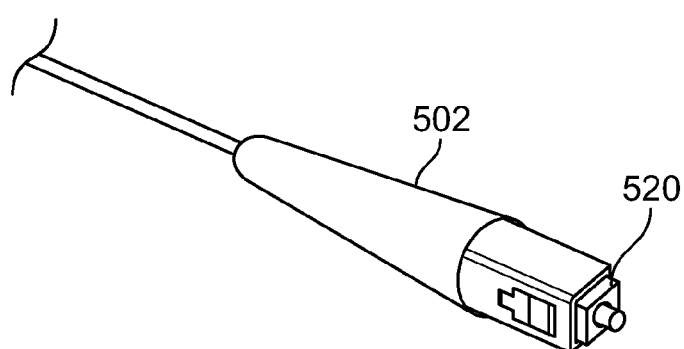

One embodiment of a fiber coupler 300 that can be used to couple the input and output fiber 206, 208 to the optical module is schematically illustrated in FIG. 3. The coupler 300 comprises two parts, namely a plug or housing 302, attached to the end of the fiber 304, and a receptacle 306, in which the housing 302 is coupled. The housing 302 has a housing locking mechanism 308 that locks to a receptacle locking mechanism 309 when the housing 302 is coupled to the receptacle 306. The fiber 304 enters the back of the plug 302. The core and cladding of the fiber 304 enter a ferrule 310 and terminate at the ferrule end 312. The plug is also referred to herein as a connector.

The ferrule 310 mates with the alignment sleeve 316 of the receptacle 306 when the plug 302 is placed in the receptacle 306. The ferrule 310 is loaded with a spring 314 to ensure that the ferrule end 312 is held in close contact with a receiving waveguide (not shown). The receiving waveguide is aligned with the core of the fiber 304 and may be, for example, another optical fiber or a substrate waveguide. The fiber couplers discussed herein are not restricted to use in an FDH, but can be used in other locations.

In some embodiments, the ferrule 310 may include a fiber stub that contains a primary core aligned with the optical fiber to receive the optical signal passing along the core and a secondary core, positioned close to the primary core, that taps off a portion of the signal propagating along the primary core as a tap signal. It will be appreciated that a portion of the optical signal propagating primarily along the primary core may actually be found outside the primary core, in the cladding. The secondary core may be referred to as a waveguide, and may also be described as being a tap core or tap waveguide. The secondary core may capture some of the optical signal propagating along the cladding. In addition, under certain circumstances, light may couple between the primary core and the secondary core.

One illustration of such an embodiment is schematically presented in FIGS. 4A and 4B. FIG. 4A shows a ferrule 402 that contains a dual-core fiber stub 404 having an end 406 that protrudes from the ferrule 402. The ferrule 402 has a stub 406 that may be advantageous in assembling the fiber connector. FIG. 4B schematically illustrates a view of the fiber end 408. In this embodiment, the primary core 410 is centrally located in the dual-core fiber stub 404, and the secondary core 412 located close to the primary core 410. The primary and secondary cores 410, 412 are embedded within a cladding 414 material having a refractive index lower than the refractive index of either the primary core 410 or the secondary core 412. The refractive index of the secondary core 412 may be the same as the refractive index of the primary core 410, but this is not a necessary condition, and the refractive indices of the primary and secondary cores 410, 412 may be different. A cover layer 416 may be provided to protect the cladding 414. It will be appreciated that the primary core 410 need not be located centrally in the fiber stub 404, but may be located off-center.

The invention is not restricted to monitoring light propagating along single-core fibers, but is also applicable to monitoring signals propagating along multi-core fibers, including dual-core fibers and fibers with more cores. Another embodiment of the invention is schematically illustrated in FIG. 4C, which shows the view of a fiber end 408. In this embodiment, the fiber along which the optical signal propagate is a dual-core fiber. Thus, the stub 404 has two primary cores 410a, 410b that align to the cores of the dual-core fiber. The stub 404 also has two secondary cores 412a, 412b that tap light out of the respective primary cores 410a, 410b for subsequent detection.

The description that follows considers using a single-core fiber, but it should be understood that the invention disclosed herein is also intended to cover monitoring light from multi-core fibers, such as a dual-core fiber in the embodiment illustrated in FIG. 4C.

A fiber stub may be spliced to the signal-carrying optical fiber, for example, using a method as illustrated in FIGS. 5A-H. In this embodiment, the optical fiber is a single-core fiber. Various connector parts, for example, a boot 502 and shield 504 are slid onto the fiber cable 506, FIG. 5A, and the end of the fiber cable 506 is prepared by adding a spacer 508. The dual core stub 510, coupled to the ferrule 512, is positioned with its primary core in alignment with the core of the fiber 514 in the fiber cable 506, FIG. 5C, and the stub 510 is spliced to the fiber 514, for example using a fusion splicer 516, FIG. 5D. The splice point can be overcoated, for example with a resin or the like 517, FIG. 5E. The ferrule stub is then overmolded with an overmold cover 518, FIG. 5F. The connector 520 can then be assembled on the end of the fiber cable, FIG. 5G, and the boot and grip can be snapped on over the connector, FIG. 5H. It will be appreciated that any type of fiber connector may be used with a dual-core fiber stub/ferrule.

Figure 6A:
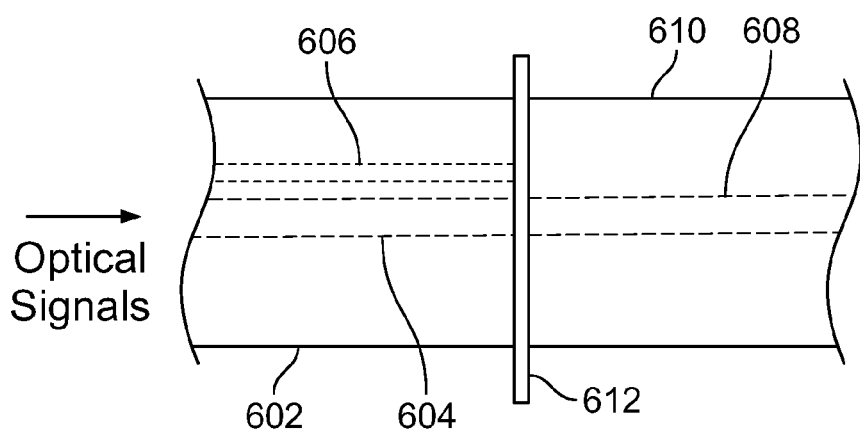
FIG. 6A schematically illustrates abutting fibers in a connector having a detector unit according to an embodiment of the invention.

An approach to detecting the tapped signal in a connector is schematically illustrated in FIG. 6A. The figure shows a first fiber 602. The ferrule and other connector components containing the first fiber 602 have been omitted for clarity. The first fiber 602 is a dual core fiber, having a primary core 804 that carries the signal and a secondary core 606 that carries a tapped fraction of the signal. The first fiber 602 may be a dual core fiber stub or tapered dual core fiber as discussed above. The primary core 604 of the first fiber 602 is aligned with the core 608 of a second waveguide 610, so that the signal light is passed from the primary core 604 into the second waveguide 610. The second waveguide 610 may be another fiber or may be a waveguide on the substrate of an optical circuit or optical device.

A thin substrate 612 carrying a photodetector 614 is placed between the abutting ends of the first fiber 602 and the second waveguide 610. The portion of the substrate 612 between the first fiber 602 and the second waveguide 610 is transparent to permit the signal light to pass between the first fiber 602 and the second waveguide 610. A photodetector 614 is integrated with the substrate 612 and aligned with the output end of the secondary core 606 to detect the tapped light propagating along the secondary core 606. The substrate 612 may be formed of a thin transparent material, such as a polymer film, or other suitable material.

Figure 6B:
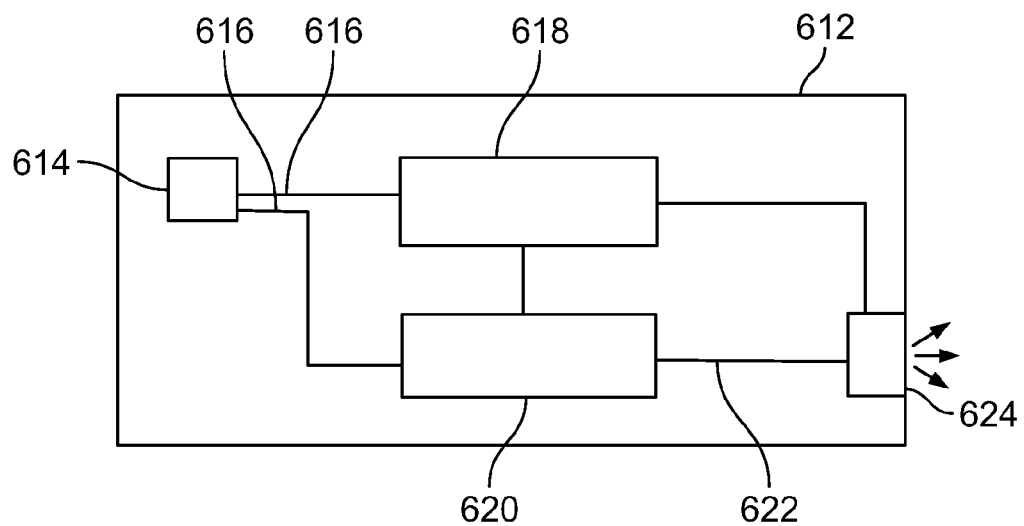
FIG. 6B schematically illustrates an embodiment of a detector unit according to an embodiment of the invention.

An embodiment of the foil 612 is schematically illustrated in FIG. 6B, showing the photodetector 614, along with electrical connections 616 to the photodetector 614. In some embodiments the photodetector 614 may be a flexible photodetector, for example a polymer photodiode, or the like. The substrate 612 may also include some electrical elements for the photodetector, such as power supply 618 to provide power to the photodetector 614 and an amplifier 620 to amplify the electrical signal produced by the photodetector 614. The power supply 618 may also provide power to the amplifier 620.

An output 622 from the amplifier 620 may drive an indicator 624, to indicate that the photodetector 614 has detected a tapped signal from the secondary core 606. In the illustrated embodiment, the indicator 624 may be an LED 624. Any other suitable type of indicator may be used to provide a signal to the operator indicating the presence of the optical signal on the fiber, including some other type of light emitting device, an acoustic device, or an antenna for emitting an electromagnetic signal, e.g. a GHz or RF signal. The photodetector 614 and associated electrical components may be referred to as a detector unit. The indicator may provide an output at one of multiple levels selected to indicate increasing levels of light propagating within the optical fiber, or may simply provide an output at a single level to indicate detection of an optical signal above a specific threshold propagating along the optical fiber.

While the photodetector 614 preferably has a small thickness so that the primary core 604 can be placed close to the core 608 of the second waveguide, thus reducing optical coupling losses between the two, the other elements of on the foil can be placed at a distance away from the photodetector 612 so that they are outside the ferrules, and so can have a thickness great than is preferred for the photodetector 614.

In other embodiments, different components may be mounted on different substrates that are electrically connected. For example, the photodetector 614 may be mounted on a first substrate and the electrical elements, such as the power supply 618, amplifier 620 and components mounted on another substrate that is electrically connected to the photodetector 614.

Figure 6C:
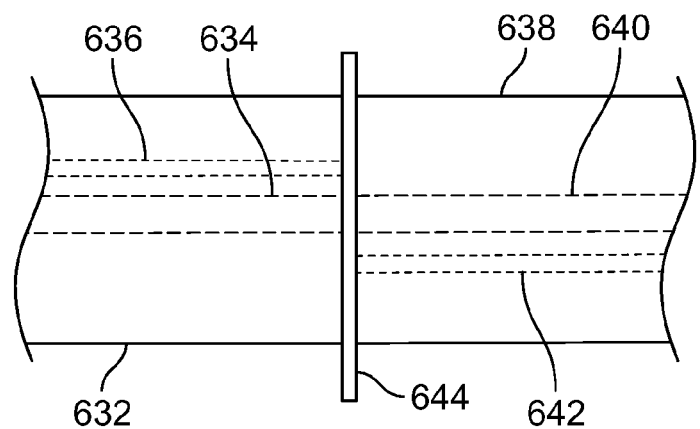
FIG. 6C schematically illustrates abutting fibers in a connector having a detector unit adapted for detecting an optical signal passing along both directions of an optical fiber according to an embodiment of the invention.

In another embodiment, schematically illustrated in FIG. 6C, a first fiber 632 has a primary core 634 and a secondary core 636, and a second waveguide 638 has a primary core 640 and a secondary core 642. The primary cores 634 and 640 are aligned so that light signals can propagate between the primary cores 634 and 640. A substrate 644 is placed between the first fiber 632 and the second waveguide 638. The substrate 644 carries two photodetectors to detect tapped signal light from the secondary core 636 of the first fiber 632 and the secondary core of the second waveguide 638. This embodiment enables the detection of signal light propagating from first fiber 632 to the second waveguide 638 and from the second waveguide 638 to the first fiber 632.

Figure 6D:
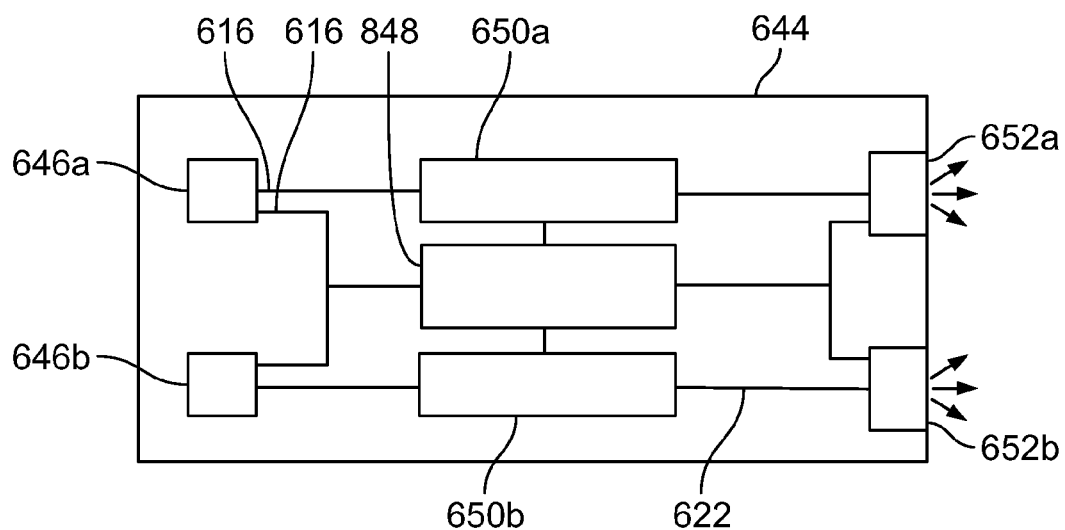
FIG. 6D schematically illustrates another embodiment of a detector unit according to the invention.

An embodiment of the substrate 644 that carries the photodetectors is schematically illustrated in FIG. 6D. The photodetectors 646a, 646b are separated on the foil 644 by the same separation as the two secondary cores 636, 642 so that they can be aligned to their respective secondary cores 636, 642. The photodetectors 646a, 646b may be oversized to make alignment with the secondary cores 636, 642 easier. The photodetectors 646a, 646b may be of any suitable shape, such as square or rectangular as illustrated, or may have another shape, such as elliptical, crescent-shaped or the like.

A power supply 648 provides power to the photodetector 646a, 646b, and to amplifiers 650a, 650b to amplify the signals generated by the photodetectors 646a, 646b. Outputs from the amplifiers 650a, 650b may be directed to respective indicators, such as LEDs, to indicate that tapped signals have been detected by the photodetectors 646a, 646b. In the illustrated embodiment, the substrate 644 is provided with two LEDs, 652a, 652b, to indicate that signals have been received by respective photodetectors 646a, 646b.

In other embodiments, different components may be mounted on different substrates that are electrically connected. For example, the photodetectors 646a, 646b may be mounted on a first substrate, with the electrical elements used to amplify and generate a user signal from the first photodetector 646a on a second substrate and the electrical elements used to amplify and generate a user signal from the second photodetector 646b on a third substrate.

Under select conditions of optical coupling between the primary core and the secondary core, the optical coupling from the primary core to the secondary core may be tailored for a wavelength, $\lambda_T$, different from the wavelength of the optical signal. In this case, the optical signal carrying the information may pass through the connector without any significant loss of power for detection, while a portion of the companion signal at $\lambda_T$ is coupled into the secondary core for detection. Furthermore, a fiber stub may be provided with different secondary cores to tap off signals at respectively different wavelengths propagating along the fiber. For example, many fiber optical communication systems carry signals at three different wavelengths, for internet, cable television and system monitoring (e.g. optical time domain reflectometry (OTDR)). A fiber stub may be provided with multiple, wavelength-selective secondary cores and respective detectors to monitor the signals at the different wavelengths independently of each other, so that a user can determine if individual optical channels are faulty.

Figure 6E:
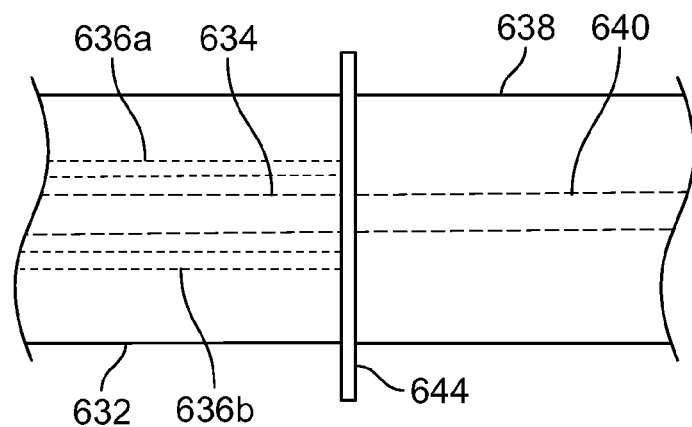
FIG. 6E schematically illustrates abutting fibers in a connector having a detector unit adapted for independently detecting optical signals at different wavelengths passing along an optical fiber according to an embodiment of the invention.

One embodiment of a fiber stub that permits independent monitoring of optical signals at different wavelengths is schematically illustrated in FIG. 6E. The fiber stub 632 includes two secondary cores 636a, 636b. The first secondary core 636a is adapted to couple light from the primary core 634 at a first wavelength while the second secondary core 636b is adapted to couple light from the primary core at a second wavelength. The substrate 644 may include circuitry like that shown in FIG. 6D for monitoring optical signals in two separate channels. Thus, the indicator 652a and 652b may independently indicate the presence of signals at respective different wavelengths along the optical fiber.

Figure 7A:
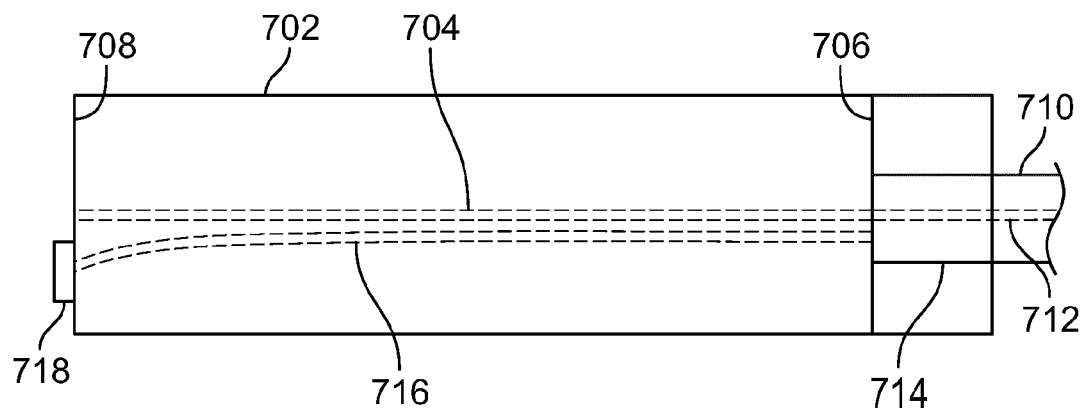
FIGS. 7A-C schematically illustrate an embodiment of a ferrule provided with primary and secondary cores according to the invention.
Figure 7B:
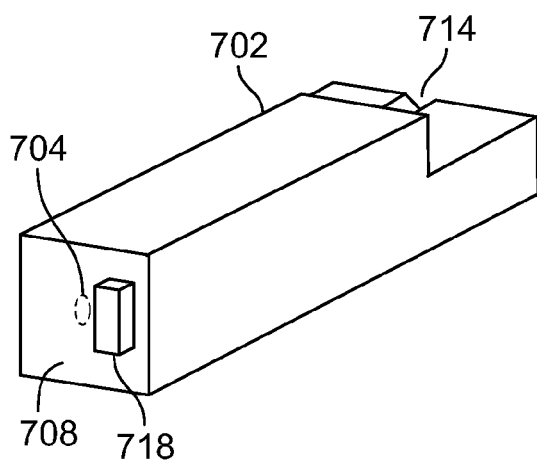
Figure 7C:
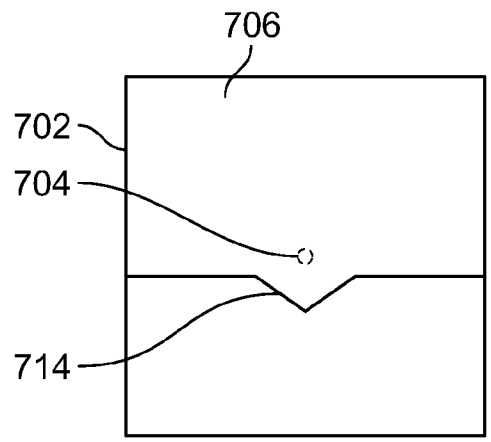

Another embodiment of a device that taps a portion of signal light for detection is schematically illustrated in FIGS. 7A-C. In this embodiment, a ferrule 702 has a primary waveguide 704 between a first face 706 and a second face 708. A fiber 710 is attached to the ferrule 702 with its core 712 aligned with the primary waveguide 704 of the ferrule. The fiber 710 is aligned in a V-groove alignment feature 714 at the input end of the ferrule 702. The V-groove alignment feature 714 and the primary waveguide 704 can be formed in the ferrule material, for example glass, using femtosecond laser etching in a manner like that described in U.S. Provisional Patent Application No. 62/023,055, "Optical Fiber and Waveguide Devices Having Expanded Beam Coupling," filed on Jul. 10, 2014, incorporated herein by reference.

The ferrule 702 also includes a secondary waveguide 716 that taps a portion of the light signal propagating along the primary waveguide 704. A photodetector 718 is placed at the second face 708 of the ferrule 702. The photodetector 718 may be placed on a substrate in a manner like that discussed above with regard to FIGS. 6A-8D. The photodetector is preferably thin so as to permit the output end of the primary waveguide 704 to closely approach the other waveguide or fiber to which the ferrule is being coupled.

FIG. 7A shows a top view of the ferrule 702, with the fiber 710 attached. FIG. 7B shows a perspective view from the second face 708 of the ferrule 702 and FIG. 7C is an end view showing the first face 706 of the ferrule 702. The fiber is omitted from both FIGS. 7B and 7C to allow the reader to see the V-groove alignment feature 714.

Figure 7D:
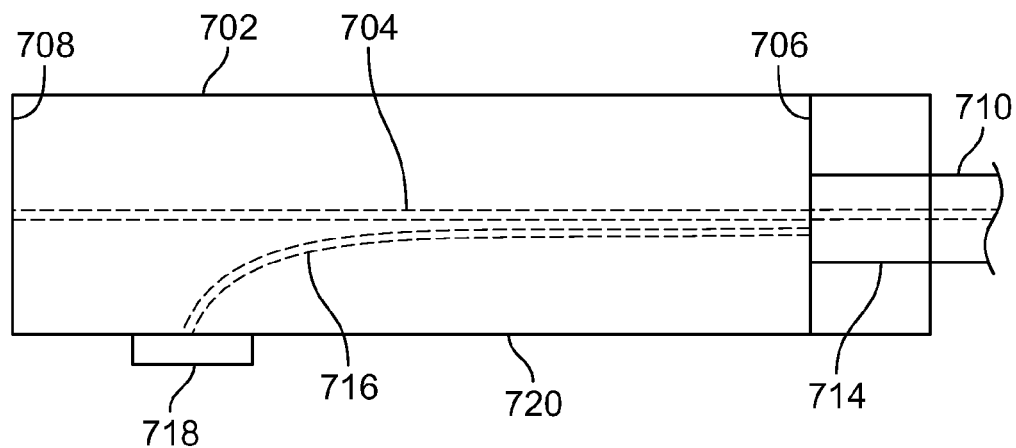
FIGS. 7D-7G schematically illustrate additional embodiments of a ferrule provided with primary and secondary cores according to the invention.

FIG. 7D schematically illustrates another embodiment of a ferrule 702 in which the secondary waveguide 716 separates sufficiently from the primary waveguide 704, within the ferrule 702, that it reaches the side face 720 of the ferrule 702. Thus, the photodetector 718 can be positioned on the side face 720, rather than the second face 708. In this embodiment, the photodetector 718 is not subject to the same thickness restrictions as in the embodiment of FIG. 7A.

Figure 7E:
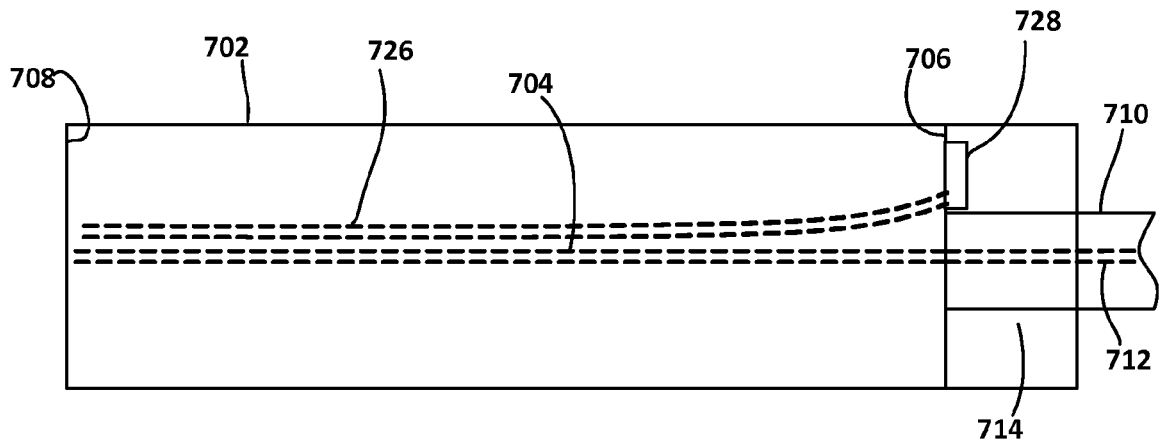

FIG. 7E schematically illustrates another embodiment of a ferrule 702 in which the secondary waveguide 726 is oriented differently from that shown in FIGS. 7A-7D. In this embodiment, the secondary waveguide 726 is oriented to tap an optical signal that enters the ferrule 702 through the second end 708, for propagating into the fiber 710. Light propagating along the secondary waveguide 726 in a direction from left to right in the figure is directed to a detector 728 for detecting a tap signal from the primary waveguide 704. In the illustrated embodiment, the detector 728 is disposed on the first face 706 of the ferrule 702, although this is not a necessary condition.

Figure 7F:
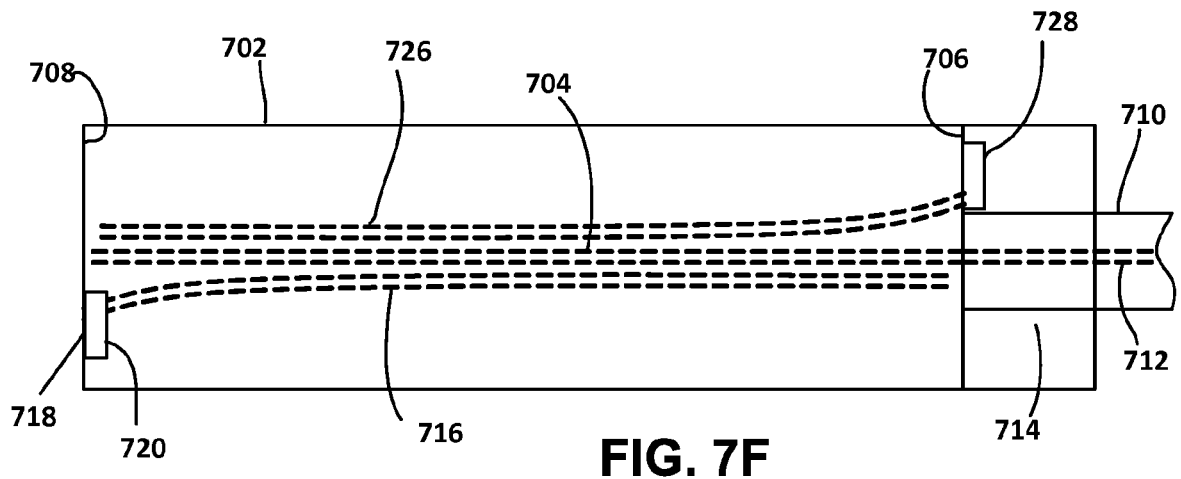

FIG. 7F schematically illustrates an embodiment of a ferrule 702 that permits monitoring of optical signals propagating in both directions through the ferrule 702. The secondary waveguide 716 and detector 718 permit monitoring of optical signals propagating from right to left in the figure, while the secondary waveguide 726 and detector 728 permit monitoring of optical signals propagating from left to right in the figure. In this embodiment, the detector 718 on the first face 708 of the ferrule 702 is located in a recess 720 so as to permit the first face 708 to closely mate with a face of another ferrule.

Figure 7G:
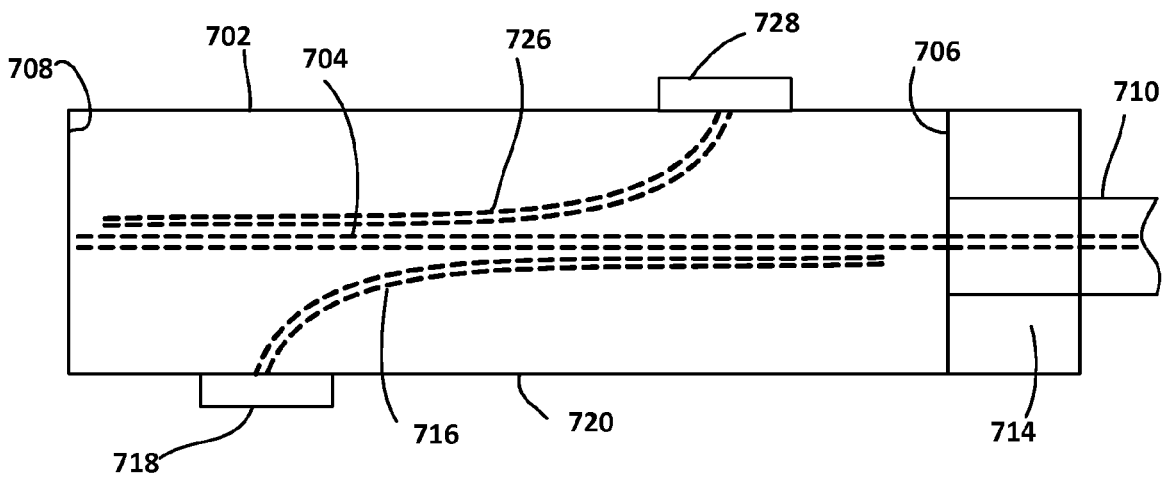

FIG. 7G schematically illustrates another embodiment of a ferrule 702 that permits monitoring of optical signals propagating in both directions through the ferrule 702. In this embodiment, the detectors 718, 728 are located at respective sides of the ferrule 702, and the secondary waveguides 716, 726 direct tapped light to the side-mounted detectors 718, 728. It will, of course, be understood that the detector 718, 728 may be positioned in locations other than those shown in the figures.

It will be appreciated that the embodiments described with reference to FIGS. 7A-7G may be provided with circuitry like that discussed earlier, to provide electrical power to the circuit, to amplify the detected signal and to provide an indication to the user that that the signal has been detected. It will further be appreciated that the ferrule 902 may be provided with different cross-sectional shapes, and is not limited to the square shape shown in FIGS. 7A and 7D. Instead, the ferrule 702 may have a rectangular, circular or elliptical cross-section, or cross-section of some other shape.

Figure 8A:
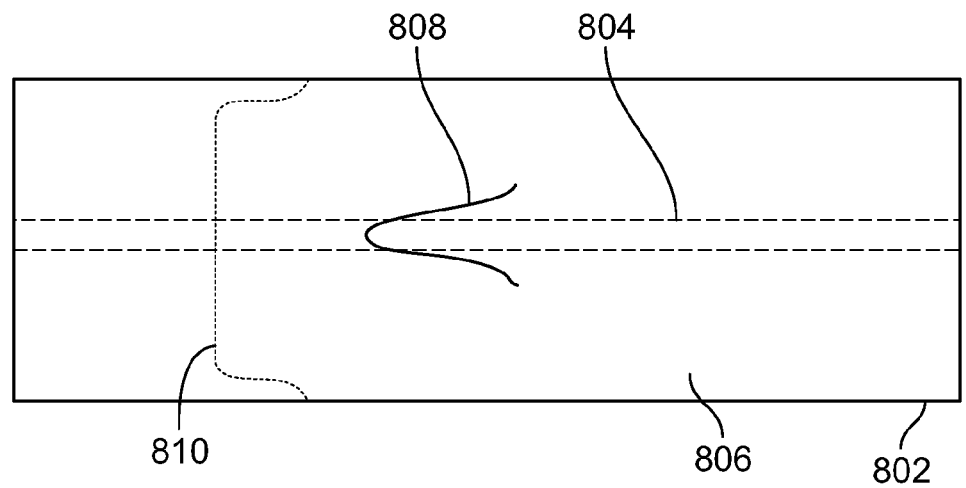
FIG. 8A schematically illustrates core and cladding modes in a single-mode fiber.
Figure 8B:
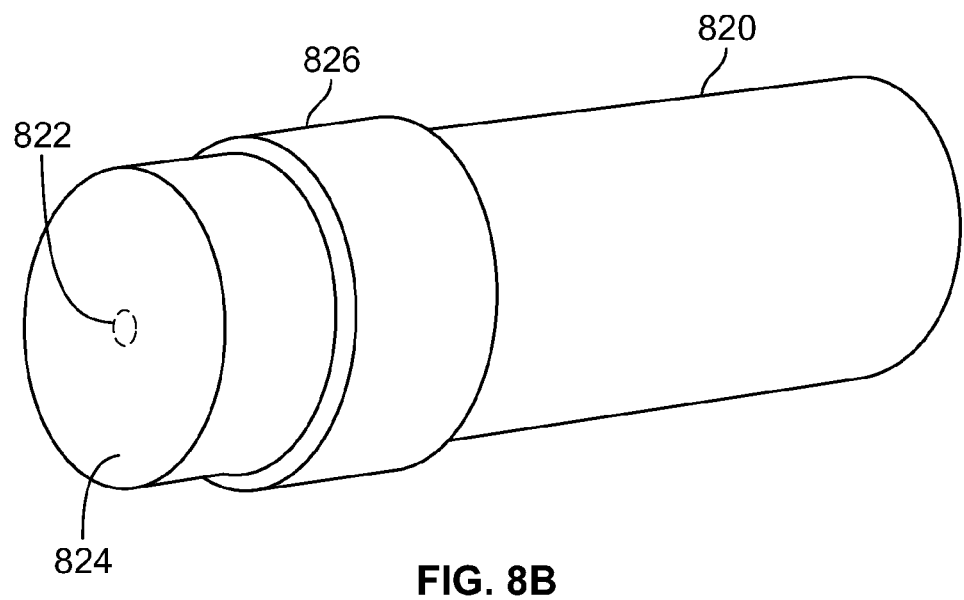
FIG. 8B schematically illustrates an arrangement for detection of light propagating in cladding modes of a fiber, according to an embodiment of the invention.

Another embodiment for detecting the presence of an optical signal propagating along an optical fiber is described with reference to FIGS. 8A and 8B. In this embodiment, the light propagating in cladding modes is detected, instead of using a secondary core to tap a portion of the light propagating along the primary core. FIG. 8A schematically illustrates a single mode optical fiber 802 having a core 804 and a cladding 806. In such a fiber 802, the core 804 has a sufficiently small diameter that it sustains the propagation of only one optical mode, having an amplitude maximum in the center of the core 804, as shown for the amplitude profile 808. The cladding on the other hand, has a larger diameter, and supports the propagation of multiple modes. In general, the amplitude profile of light propagating along the fiber in the cladding modes is much more flat, as shown by amplitude profile 810.

Broadband optical communications use single mode fiber because different modes propagate along the fiber with different speeds. In multimode operation, the short optical pulses associated with large bandwidth communications tend to wash out due to the different propagation speeds. A portion of the optical signal propagating along a single mode core, however, leaks into the cladding, for example due to imperfections in the fiber material or due to inaccuracies in focusing the light into the input end of the fiber. This light can propagate along the cladding in multiple cladding modes and so the information contained in the light in the cladding modes is typically lost. The presence of light in the cladding modes, however, does indicate that an optical signal is passing along the single mode core 804.

Cladding mode light can be detected using a photodetector positioned on the cladding surface. One embodiment of cladding mode detection is schematically illustrated in FIG. 8B, which shows a fiber 820 with a core 822 in a cladding 824. A photodetector 826 is located around at least a part of the cladding surface. The photodetector may include a single detecting element or an array of detecting elements. The detecting element or elements may be placed on a flexible substrate to enable close matching to the surface contour of the cladding 824. For example, the photodetector may include one or more polymer photodiodes, or may include a ring photodiode. Preferably, an index matching technique is used on the cladding surface to enable the cladding mode light to exit the cladding and be incident on the photodetector 826. This may include, for example, the use of a photodetector material having a refractive index close to, or higher than, that of the cladding material. In other embodiments it may include the use of index matching fluid between the photodetector and the cladding surface.

Figure 8C:
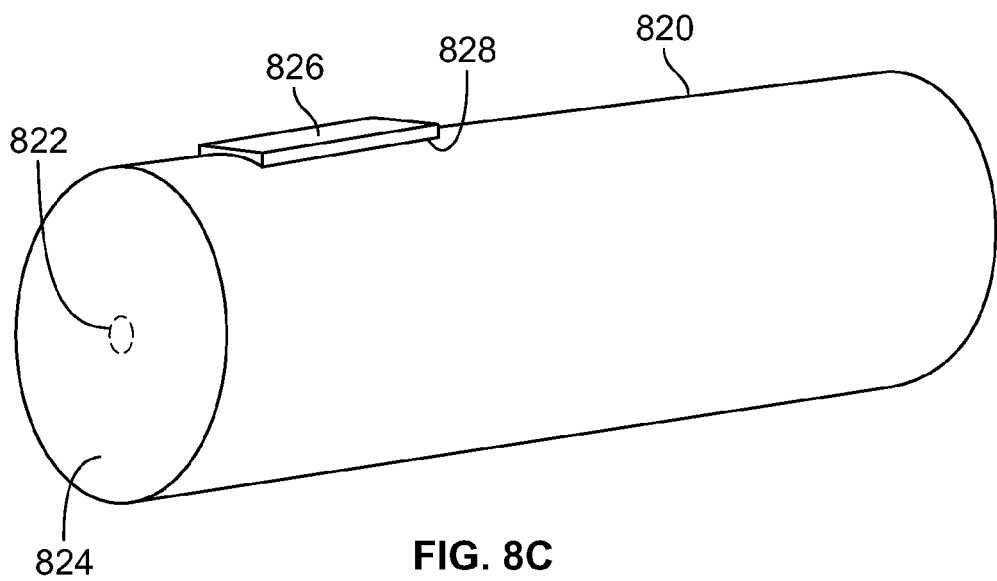
FIG. 8C schematically illustrates another arrangement for detection of light propagating in cladding modes of a fiber, according to an embodiment of the invention.

Another embodiment of a cladding mode sensor is schematically illustrated in FIG. 8C. In this embodiment, a flat portion 828 is provided on the surface of the cladding 824 that accommodates a photodetector 826.

Figure 8D:
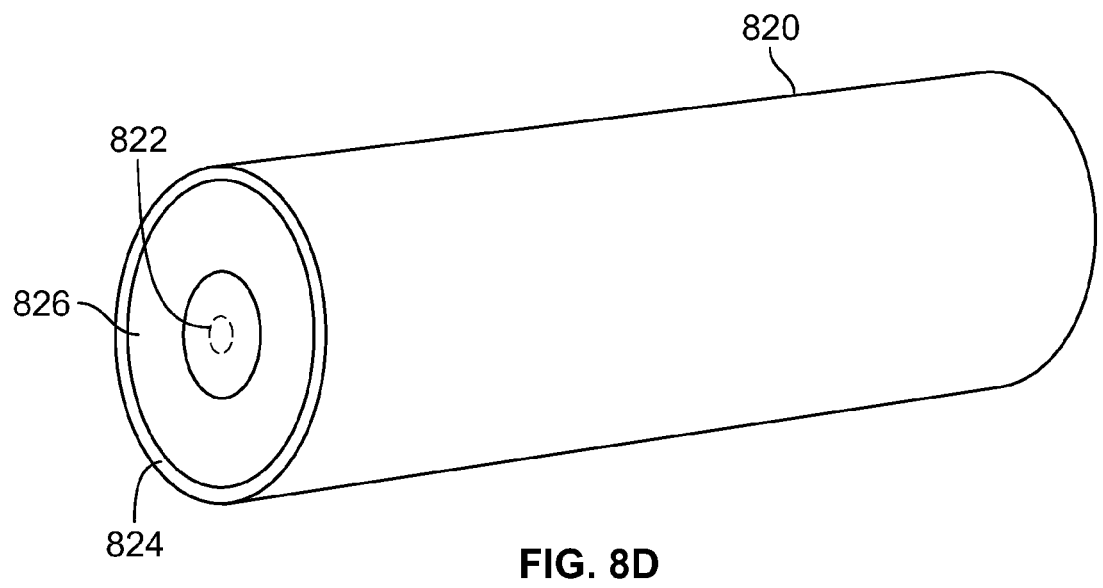
FIG. 8D schematically illustrates another arrangement for detection of light propagating in cladding modes of a fiber, according to an embodiment of the invention.

In another embodiment of a cladding mode sensor, schematically illustrated in FIG. 8D, a photodetector 826 is positioned on the output face 824 of the fiber 820 to detect light propagating along the cladding modes of the fiber 820. The photodetector 826 is provided with an aperture to transmit light from the core 822. In some embodiments, the photodetector 826 may be provided on a transparent substrate that covers the end of the core 822 but still permits transmission of the light from the core 822.

The power supply provided in a connector may be any suitable type of power supply for providing electrical to the electrical components of the detector unit, including the photodetector, amplifier and indicator. In some embodiments the power supply may be a battery, or other energy storage device. In other embodiments, power may be applied to the circuitry in the connector externally, for example via a handheld device.

Figure 9A:
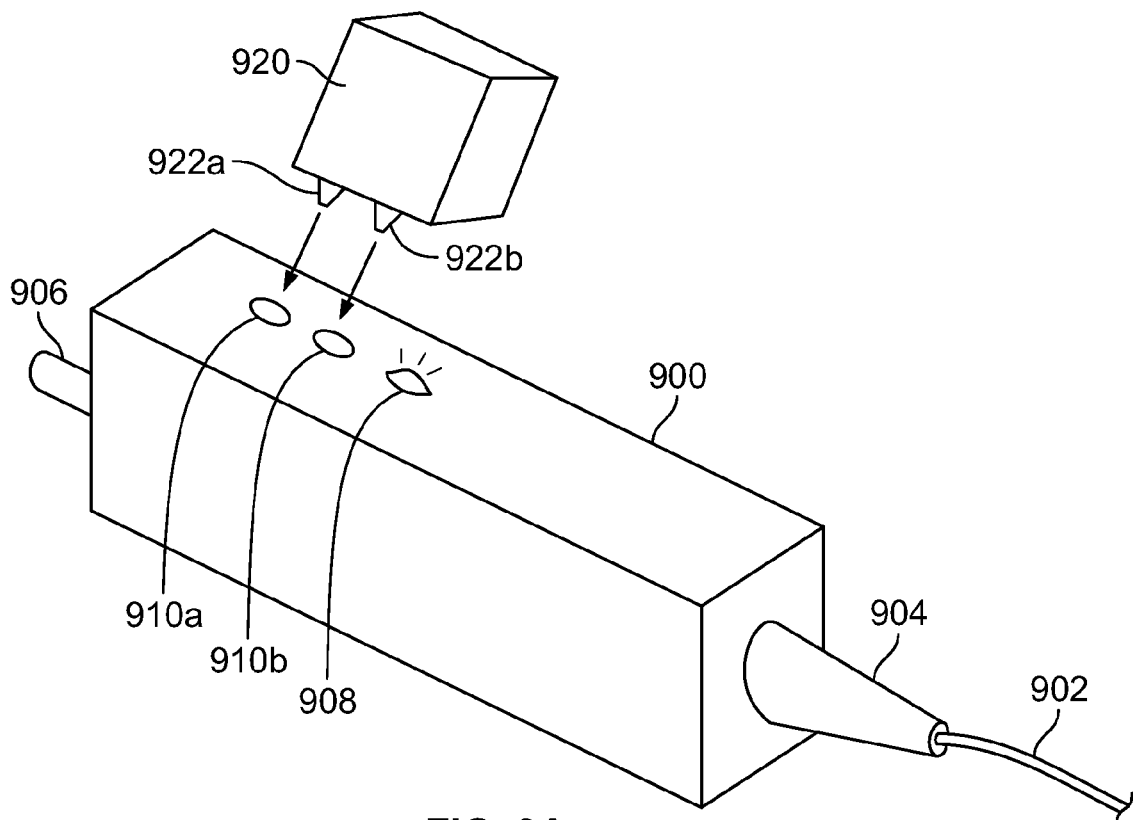
FIG. 9A schematically illustrates an arrangement of a fiber connector and portable device that may be used to detect passage of an optical signal along an optical fiber, according to an embodiment of the invention.

One embodiment of a connector 900 activated by an external device is schematically illustrated in FIG. 9A. The connector 900 is attached to a fiber cable 902, and the connection between the connector 900 and the fiber cable 902 is supported by a boot 904. A ferrule 906 protrudes from the far end of the connector 900. The connector 900 may be provided with a locking mechanism (not shown) for locking to a receptacle. In this embodiment, the connector 900 contains a photodetector for detecting a light signal passing along the fiber cable 902, in addition to an amplifier. The connector 900 also contains an indicator in the form of an LED 908. The connector housing has two external electrodes 910a, 910b, which serve to receive electrical power from an outside source.

A portable device 920, for example a hand-held device used by a technician checking for a signal passing along the fiber cable 902, has two electrical connections 922a, 922b, which can be applied to the external electrodes 910a, 919b respectively. The portable device 920 has an internal source of electrical power, for example a battery so that, when the connections 922a, 922b are put into contact with the external electrodes 910a, 910b, electrical power can be provided to the detector unit inside the connector 900. The detector unit inside the connector 900 is then powered to detect the optical signal propagating along the fiber cable 902 and can generate a signal to the user via the LED 908, or other indicator, to indicate that the optical signal has been detected.

Figure 9B:
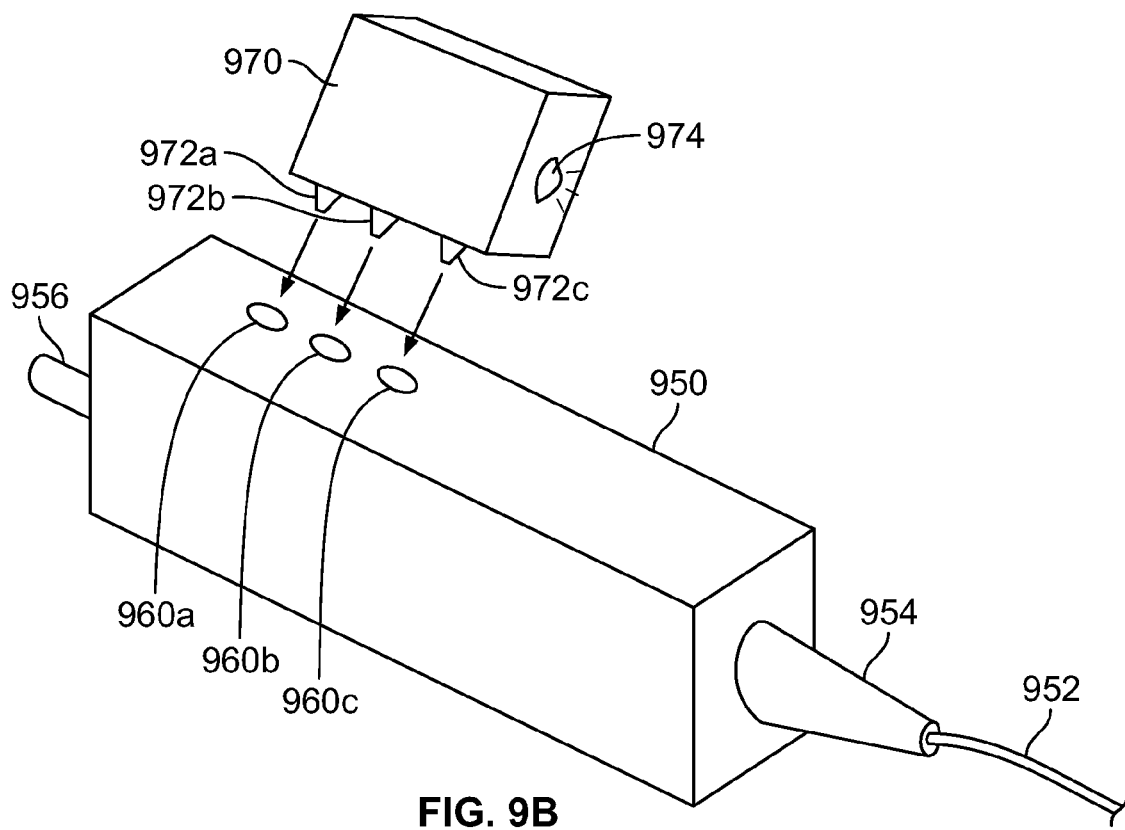
FIG. 9B schematically illustrates another arrangement of a fiber connector and portable device that may be used to detect passage of an optical signal along an optical fiber, according to an embodiment of the invention.

FIG. 9B shows another embodiment of connector 950 attached to a fiber cable 952. The fiber cable 902 is supported by a boot 954. A ferrule 956 protrudes from the far end of the connector 950. The connector 950 may be provided with a locking mechanism (not shown) for locking to a receptacle. In this embodiment, the connector 950 contains a photodetector for detecting a light signal passing along the fiber cable 952, in addition to an amplifier. The connector housing has three external electrodes 960*a*, 960*b*, 960*c* to make electrical contact with a portable device 970. In this case, one of the external electrodes 960*a* serves as a ground, another electrode 960*b* receives a driving voltage to drive the photodetector and any associated electronic components, such as an amplifier. The third electrode 960*c* provides an output signal indicating that an optical signal has been detected.

The portable device 970 has three electrical connections 972*a*, 972*b*, 972*c*, which can be applied to external electrodes 960*a*, 960*b*, 960*c* respectively. The portable device 970 has an internal source of electrical power, for example a battery so that, when the connections 972*a*, 972*b* are put into contact with the external electrodes 960*a*, 960*b*, electrical power can be provided to the detector unit inside the connector 950. Furthermore, electrode 960*c* provides a signal to connection 972*c* indicating that an optical signal has been detected in the fiber cable 952. The portable unit converts this signal into an output to the user so that the use in informed that the optical signal has been detected in the fiber cable 952. In the illustrated embodiment, the output is provided to the user via an LED 974.

Figure 10A:
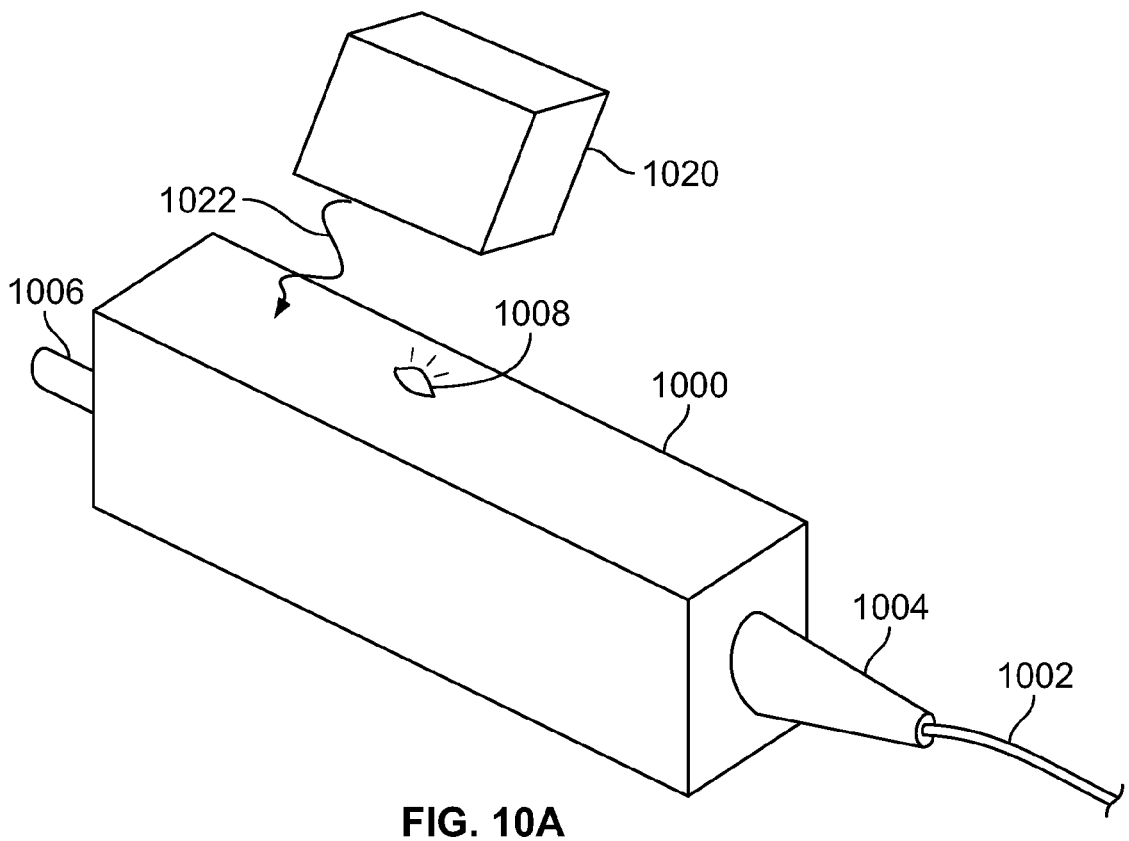
FIG. 10A schematically illustrates another arrangement of a fiber connector and portable device that may be used to detect passage of an optical signal along an optical fiber, according to an embodiment of the invention.

Another embodiment of a connector 1000 that receives power to a photodetector from an external device is schematically illustrated in FIG. 10A. The connector 1000 is attached to a fiber cable 1002, and the connection between the connector 1000 and the fiber cable 1002 is supported by a boot 1004. A ferrule 1006 protrudes from the far end of the connector 1000. The connector 1000 may be provided with a locking mechanism (not shown) for locking to a receptacle. In this embodiment, the connector 1000 contains a photodetector for detecting a light signal passing along the fiber cable 1002, in addition to an amplifier. The connector 1000 also contains an indicator in the form of an LED 1008. The connector 1000 includes an antenna (not shown) as part of a power supply. The antenna is preferably inside the housing of the connector 1000, but may also be located on the surface of the connector housing.

A portable device 1020, for example a hand-held device used by a technician checking for a signal passing along the fiber cable 1002, includes an antenna that inductively transfers electromagnetic energy 1022 to the antenna in the connector 1000. Inductive energy coupling, including resonant inductive energy coupling, is known as a mechanism for wirelessly transferring electrical energy between a source and a target. In this case, the portable device 1020 inductively couples energy to the connector 1000, providing power via the connector's antenna for the photodetector and any other electronic circuitry, such as amplifiers etc., and LED indicator 1008.

Figure 10B:
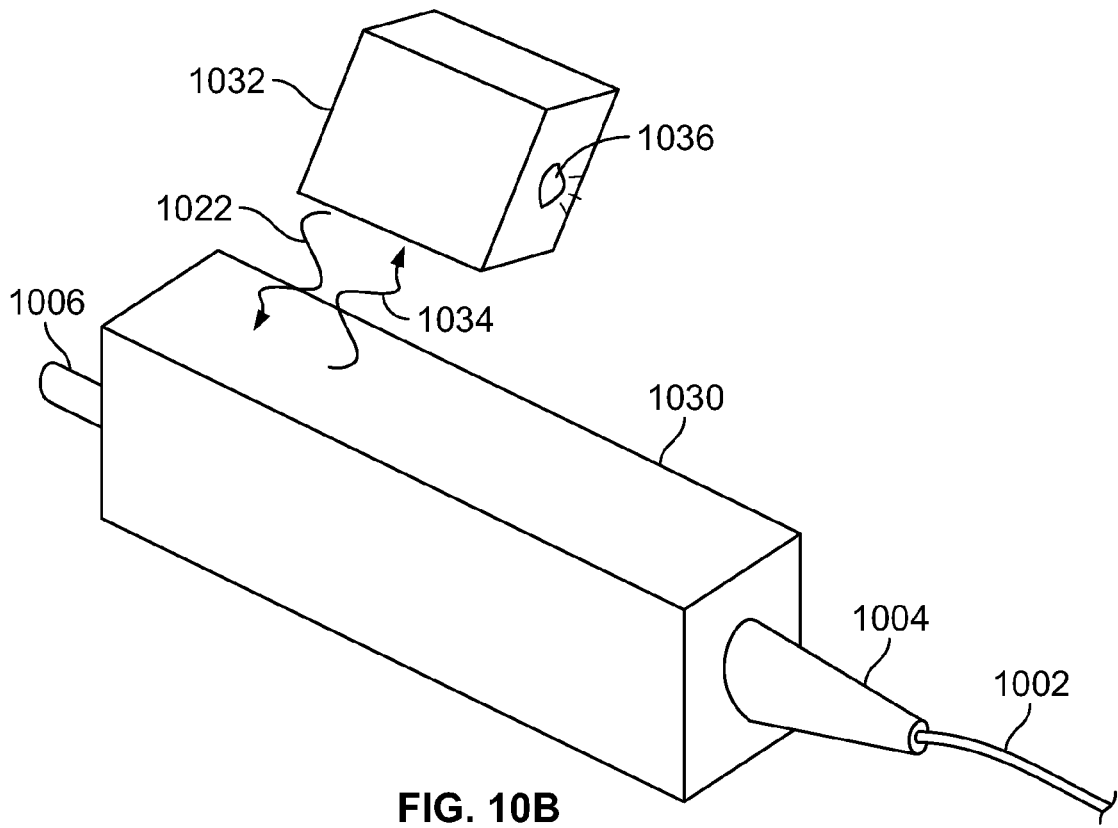
FIG. 10B schematically illustrates another arrangement of a fiber connector and portable device that may be used to detect passage of an optical signal along an optical fiber, according to an embodiment of the invention.

Another embodiment of a connector 1030 inductively powered is schematically illustrated in FIG. 10B. In this embodiment, the indicator in the connector 1030 includes a transmitter that transmits a signal 1034 back to the portable device 1032 indicating the presence of an optical signal. The portable device 1032 includes an indicator 1036, for example in the form of an LED, that notifies the user when the signal 1034 has been received, indicating that an optical signal has been detected on the fiber cable 1002.

In some embodiments, the connector may be provided with a radio frequency identification (RFID) tag, for identifying the specific connector. In such a case, the portable device may also be provided with an RFID reader, and be able to identify the connector when probing it for signal propagation information.

Figure 11A:
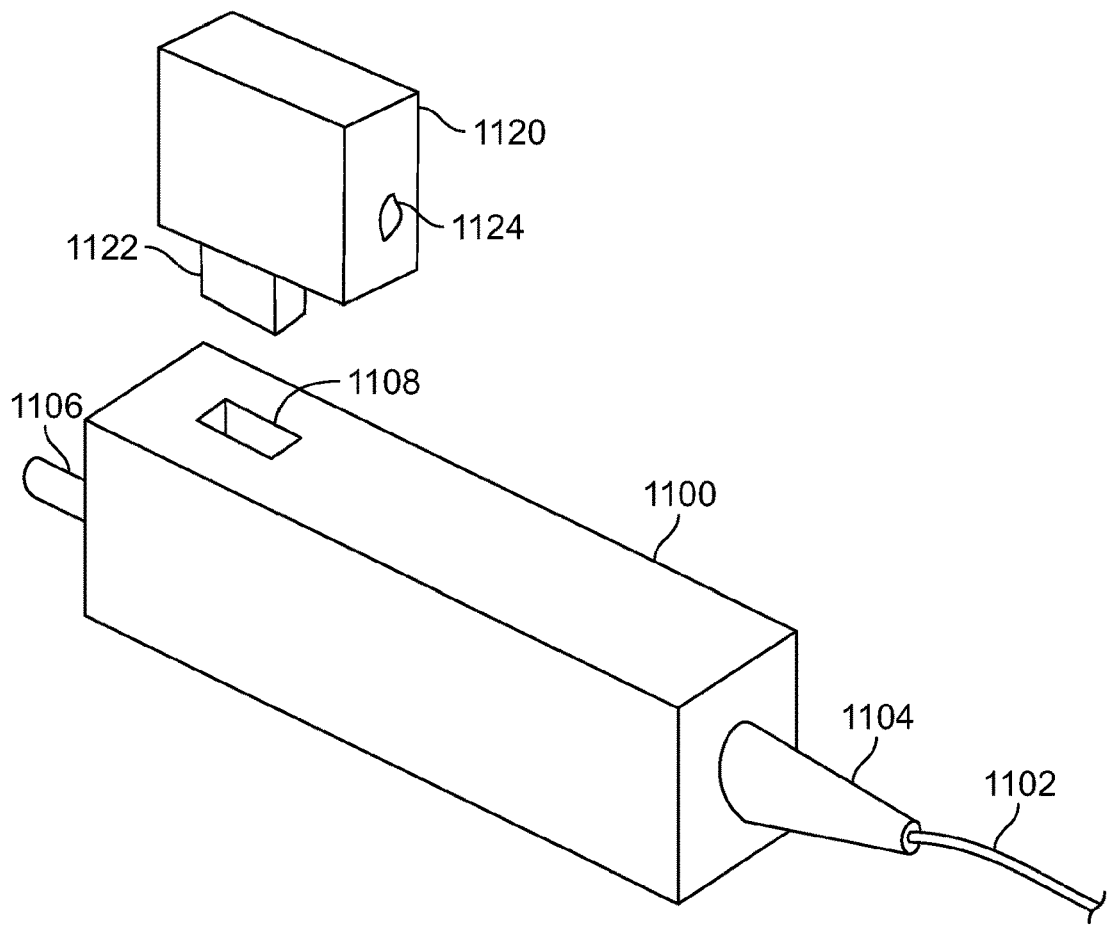
FIGS. 11A and 11B schematically illustrate another arrangement of a fiber connector and portable device that may be used to detect passage of an optical signal along an optical fiber, according to an embodiment of the invention.
Figure 11B:
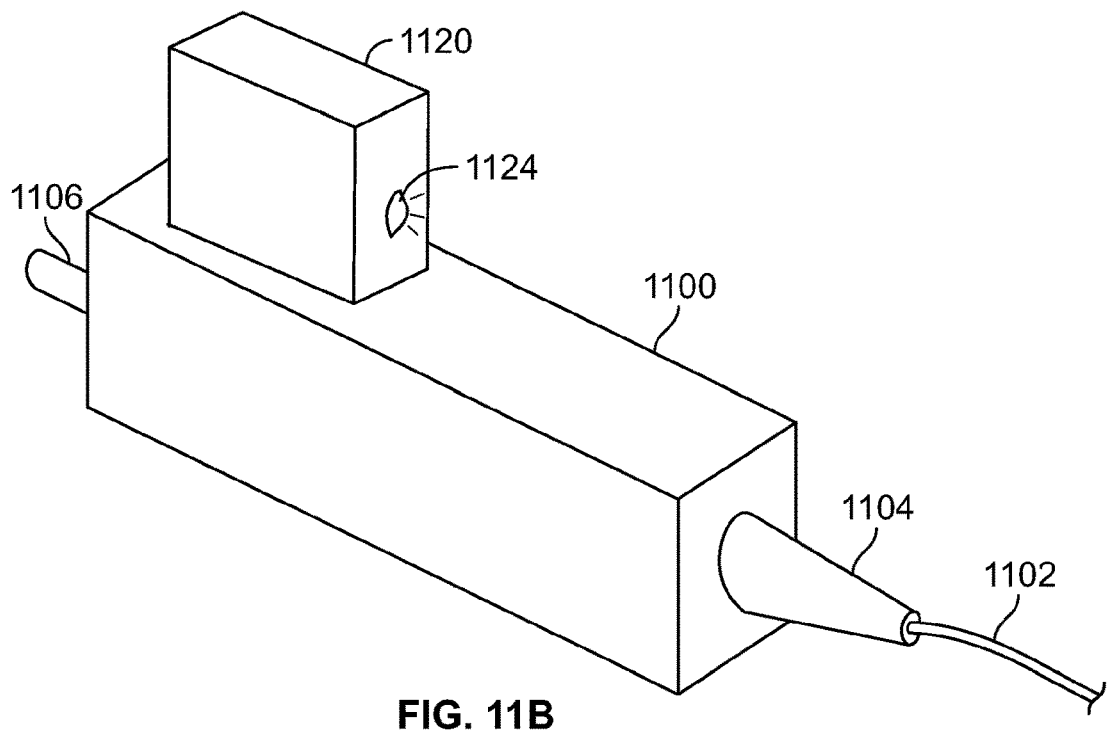

Another embodiment of a connector 1100 that is adapted to permit a user to detect the propagation of an optical signal along an optical fiber is schematically illustrated in FIGS. 11A and 11B. The connector 1100 is attached to a fiber cable 1102, and the connection between the connector 1100 and the fiber cable 1102 is supported by a boot 1104. A ferrule 1106 protrudes from the far end of the connector 1100. The connector 1100 may be provided with a locking mechanism (not shown) for locking to a receptacle. A port 1108 in the connector 1100 permits access to the optical fiber in the fiber cable 1102.

A portable device 1120 includes an interrogation head 1122 that can enter the port 1108. The interrogation head 1122 includes at its tip 1124 a photodetector that is sensitive to the wavelengths of light propagating along the fiber cable 1102. The photodetector is pushed through the port and into optical communication with the optical fiber, as shown in FIG. 11B, to detect a signal indicative of an optical signal propagating along the fiber cable 1102. The photodetector thus introduced to the connector 1100 may detect a signal in a manner like that discussed above, for example as shown in FIG. 7D or FIG. 8C, or in any other suitable manner for detecting a signal from the optical fiber. A transducer 1124, such as an LED, is provided on the portable device 1120 to indicate to the user when a fiber signal has been detected.

While various examples were provided above, the present invention is not limited to the specifics of the examples. For example, various combinations of elements shown in different figures may be combined together in various ways to form components not specifically described herein. Furthermore, the use of the terms "housing" and "receptacle" should not be understood to distinguish between one part of the coupler being fixed, e.g. in a fiber rack, and the other being at the end of a free fiber. In the present description, the optical detector unit is located in the housing, although in some embodiments part of the optical detector unit may be found in the hosing while another part of the detector unit may be located in the receptacle.

As noted above, the present invention is applicable to fiber optical communication and data transmission systems. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A system for monitoring a signal on an optical fiber, comprising:
a fiber optic connector having a connector housing couplable to a receptacle;
an optical fiber for transmitting a first optical signal, the optical fiber comprising a first fiber core and comprising a first end, the first optical signal being transmitted along the first fiber core;
a transparent optical element in the connector housing and positioned at the end of the optical fiber, the transparent optical element comprising a primary waveguide, the primary waveguide having a first end at a first face of the transparent optical element, the primary waveguide being aligned to the first fiber core, the transparent optical element also comprising a first tap waveguide, at least a portion of the first tap waveguide being proximate the primary waveguide to tap a portion of the first optical signal as a tap signal, the first tap waveguide having a first end terminating proximate a surface of the transparent optical element; and a first detector disposed to receive the tap signal from the first end of the first tap waveguide.

2. The system as recited in claim 1, wherein the transparent optical element further comprises an alignment feature, the optical fiber being positioned by the alignment feature so that the first fiber core is aligned with the primary waveguide.

3. The system as recited in claim 2, wherein the alignment feature comprises a V-groove.

4. The system as recited in claim 1, wherein the transparent optical element comprises a second face, the primary waveguide having a second end at the second face.

5. The system as recited in claim 4, wherein the first detector is located at the second face.

6. The system as recited in claim 1, wherein the transparent optical element comprises a second face, the primary waveguide having a second end at the second face, the first tap waveguide terminating proximate a side surface of the transparent optical element between the first face and the second face of the transparent optical element.

7. The system as recited in claim 6, wherein the first detector is located on the side of the transparent optical element to receive the first tap signal from the first tap waveguide.

8. The system as recited in claim 1, wherein the first optical signal passes from the first optical fiber to the primary waveguide, and the first tap waveguide is disposed to couple a portion of first optical signal to the first detector.

9. The system as recited in claim 1, wherein the first detector is located at the first face of the transparent optical element.

10. The system as recited in claim 1, wherein the first optical signal passes from the primary waveguide to the first optical fiber, and the first tap waveguide is disposed to couple a portion of the first optical signal to the first detector.

11. The system as recited in claim 1, wherein the transparent optical element further comprises a second tap waveguide and a second detector at a first end of the second tap waveguide, the first tap waveguide being positioned to tap a portion of the first optical signal propagating from the optical fiber to the primary waveguide and the second tap waveguide being positioned to tap a portion of a second optical signal propagating from the primary waveguide to the optical fiber.

12. The system as recited in claim 11, wherein transparent optical element comprises a second face opposing the first face.

13. The system as recited in claim 12, wherein the first end of the first tap waveguide is located at the second face.

14. The system as recited in claim 12, wherein the transparent optical element further comprises a first side disposed between the first and second faces, the first end of the first tap waveguide being located at the first side.

15. The system as recited in claim 1, wherein the first detector is located within the housing.

16. The system as recited in claim 1, wherein the first detector is contained in a portable detector unit separate from the housing, the portable detector unit being couplable with housing so that the first detector is capable of detecting the optical tap signal from the first tap waveguide.

17. A fiber optic connector, comprising:
a housing;
a transparent dielectric optical element within the housing, the optical element having a first face and a second face, a primary waveguide within the optical element for guiding a first optical signal between the first face and the second face, a tap waveguide within the optical element, at least a portion of the tap waveguide positioned proximate the primary waveguide so as to permit optical coupling of a portion of the first optical signal from the primary waveguide to the tap waveguide as a tap signal; and
an optical fiber having a fiber core aligned with the primary core of the optical element.

18. The fiber optic connector as recited in claim 17, further comprising an optical detector disposed to receive the tap signal from the tap waveguide.

19. The fiber optic connector as recited in claim 18, wherein the optical detector is disposed on a surface of the glass element.

20. The fiber optic connector as recited in claim 17, wherein the optical element further comprises an alignment feature, the optical fiber being aligned by the alignment feature so that the fiber core is aligned with the primary core of the optical element.

* * * * *